United States Patent
Lin et al.

(10) Patent No.: US 9,730,152 B2
(45) Date of Patent: Aug. 8, 2017

(54) UE ENHANCEMENT IN FDD-TDD JOINT OPERATION NETWORKS

(71) Applicant: MEDIATEK INC., Hsinchu (TW)

(72) Inventors: Shiang-Jiun Lin, Hsinchu (TW); Xiangyang Zhuang, Lake Zurich, IL (US); Chien-Hwa Hwang, Hsinchu County (TW)

(73) Assignee: MEDIATEK INC., Hsin-chu (TW)

( * ) Notice: Subject to any disclaimer, the term of this patent is extended or adjusted under 35 U.S.C. 154(b) by 274 days.

(21) Appl. No.: 14/496,148

(22) Filed: Sep. 25, 2014

(65) Prior Publication Data

US 2015/0092630 A1    Apr. 2, 2015

Related U.S. Application Data

(60) Provisional application No. 61/883,340, filed on Sep. 27, 2013.

(51) Int. Cl.
*H04W 48/20* (2009.01)
*H04W 48/18* (2009.01)
(Continued)

(52) U.S. Cl.
CPC ............... *H04W 48/20* (2013.01); *H04L 5/14* (2013.01); *H04L 5/143* (2013.01); *H04L 5/1469* (2013.01);
(Continued)

(58) Field of Classification Search
CPC ......... H04L 5/14; H04L 5/143; H04L 5/1469; H04W 36/0072; H04W 36/30;
(Continued)

(56) References Cited

U.S. PATENT DOCUMENTS

2006/0040681 A1*  2/2006  Julka ..................... H04W 68/00
                                                        455/458
2007/0041347 A1   2/2007  Beale et al. .................. 370/277
(Continued)

FOREIGN PATENT DOCUMENTS

CN          103220657 A      7/2013
EP            2536178 A1    12/2012
WO      WO2013063793 A1     5/2013

OTHER PUBLICATIONS

International Search Report and Written Opinion of International Search Authority for PCT/CN2014/087557 dated Jan. 6, 2014 (13 pages).

(Continued)

*Primary Examiner* — Redentor Pasia
(74) *Attorney, Agent, or Firm* — Imperium Patent Works; Zheng Jin; Darien Wallace (57) ABSTRACT

To support the new characteristics where FDD carriers and TDD carriers provide different services with different QoS or with different coverage or with different mobility robustness, UE enhancements of FDD-TDD network are proposed. In one embodiment, a dual mode UE in idle mode camps on a source cell and determines a target cell based on the cn domain and/or additional paging information contained in an enhanced paging message. In another embodiment, a dual mode UE may establish an RRC connection with a source cell with TDD carrier, and later is handover or redirected to a target cell supporting voice over IMS. The handover or redirection is based on the cn domain and/or the additional paging information contained in the enhanced paging message.

23 Claims, 7 Drawing Sheets

(51) Int. Cl.
  *H04W 36/00* (2009.01)
  *H04L 5/14* (2006.01)
  *H04W 28/02* (2009.01)
  *H04W 36/30* (2009.01)
  *H04W 48/08* (2009.01)
  *H04W 88/06* (2009.01)

(52) U.S. Cl.
  CPC ... *H04W 28/0268* (2013.01); *H04W 36/0022* (2013.01); *H04W 36/0072* (2013.01); *H04W 36/0083* (2013.01); *H04W 36/30* (2013.01); *H04W 48/08* (2013.01); *H04W 48/18* (2013.01); *H04W 36/0061* (2013.01); *H04W 88/06* (2013.01)

(58) Field of Classification Search
  CPC ......... H04W 36/0083; H04W 36/0022; H04W 48/08; H04W 48/20; H04W 48/18; H04W 28/0268
  See application file for complete search history.

(56) References Cited

U.S. PATENT DOCUMENTS

| | | | | |
|---|---|---|---|---|
| 2010/0098023 | A1* | 4/2010 | Aghili | H04W 36/0022 370/331 |
| 2010/0178941 | A1* | 7/2010 | Chun | H04W 68/00 455/458 |
| 2010/0240400 | A1* | 9/2010 | Choi | H04W 68/02 455/458 |
| 2010/0279677 | A1* | 11/2010 | Dwyer | H04W 48/16 455/422.1 |
| 2010/0316034 | A1* | 12/2010 | Burbidge | H04W 36/0022 370/338 |
| 2011/0028120 | A1* | 2/2011 | Wu | H04W 36/0022 455/404.1 |
| 2011/0216645 | A1* | 9/2011 | Song | H04W 36/0022 370/216 |
| 2012/0014345 | A1* | 1/2012 | Faurie | H04W 36/0022 370/329 |
| 2012/0202491 | A1* | 8/2012 | Fox | H04B 7/2609 455/435.1 |
| 2012/0218922 | A1 | 8/2012 | Klingenbrunn et al. | 370/280 |
| 2012/0250590 | A1 | 10/2012 | Schnellbacher et al. | 370/280 |
| 2013/0034080 | A1* | 2/2013 | Yang | H04W 36/0055 370/331 |
| 2013/0136096 | A1* | 5/2013 | Lee | H04W 8/04 370/329 |
| 2015/0282011 | A1* | 10/2015 | Watfa | H04W 36/0022 370/332 |

OTHER PUBLICATIONS

EPO, Search Report for the EP patent application 14847853.0 dated Jul. 25, 2016 (11 pages).

3GPP TSG RAN WG1 Meeting #74 R1-133455, NTT DOCOMO, Views on Possible Solutions for TDD-FDD Joint Operation, Barcelona, Spain dated Aug. 19-23, 2013 (3 pages).

3GPP TSG RAN WG1 Meeting 74 R1-133289, MediaTek Inc., Dual mode operation in the FDD-TDD scenario, Barcelona, Spain dated Aug. 19-23, 2013 (5 pages).

* cited by examiner

UE ENHANCEMENT IN FDD-TDD JOINT OPERATION NETWORKS

CROSS REFERENCE TO RELATED APPLICATIONS

This application claims priority under 35 U.S.C. §119 from U.S. Provisional Application No. 61/883,340, entitled "Idle Mode Enhancement in FDD-TDD Joint Operation Networks," filed on Sep. 27, 2013, the subject matter of which is incorporated herein by reference.

TECHNICAL FIELD

The disclosed embodiments relate generally to FDD-TDD joint operation, and, more particularly, to UE enhancement in FDD-TDD joint operation networks.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Recently, 3GPP systems, such as LTE-Advanced (LTE-A), improves spectrum efficiency by utilizing diverse deployments in a heterogeneous network topology, which means the maximum transmit power, the operating frequency, and the deployment location and density of eNBs can be very different. One possible deployment scenario is to utilize the different characteristics of carriers an operator has, e.g., joint operation of Frequency Division Duplex (FDD) and Time Division Duplex (TDD) carriers.

In a conventional FDD-TDD network, FDD carrier and TDD carrier work independently. For a conventional dual mode UE, the UE should be capable to operate in either FDD mode or TDD mode where "operate" means receiving and transmitting simultaneously in the case of FDD or one at a time in the case of TDD. Once the operating mode is determined, UE should behave like the operation in single mode case. In other words, conventional dual mode UEs have TDD and FDD RFs, while baseband capability is similar to single mode capable UEs. The protocol stack at UE side is equipped with one radio resource control (RRC), one packet data convergence protocol (PDCP), one radio link control (RLC), and a common media access control (MAC) with a hybrid automatic repeat request (HARQ) entity. Once the operation mode is chosen, the HARQ entity should be associated to that operation mode.

In a future FDD-TDD network, joint operation between FDD and TDD carriers to fully utilize the different characteristics can be expected. New characteristics of FDD-TDD operations should be considered and the associated enhancements are desired.

SUMMARY

To support the new characteristics where FDD carriers and TDD carriers provide different services with different QoS or with different coverage or with different mobility robustness, UE enhancements of FDD-TDD network are proposed.

In one embodiment, a dual mode UE in idle mode camps on a source cell and determines a target cell based on the cn domain and/or additional paging information contained in an enhanced paging message. The additional paging message comprises a target carrier type, a service type that triggers the paging, and/or a QoS class indicator (QCI). For example, the target cell is different from the source cell if the additional paging information indicates that the source cell does not belong to the same target carrier type or the source cell does not support the same service type or QCI indicated by the paging.

In another embodiment, a dual mode UE may establish an RRC connection with a source cell with TDD carrier, and later is handover or redirected to a target cell supporting voice over IMS. The handover or redirection is based on the cn domain and/or the additional paging information contained in the enhanced paging message. In one example, the UE receives a handover command to handover from the source cell to the target cell. In another example, the UE receives a redirect command to enter idle mode and camp on the target cell with a higher priority, and then connects with the target cell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In future FDD-TDD networks, joint operation between Frequency Division Duplex (FDD) and Time Division Duplex (TDD) carriers to fully utilize the different carrier characteristics can be expected. One deployment scenario is that FDD carrier are deployed with well-planned topology, with better inter-eNodeB backhaul and with higher transmit power to provide robustness of coverage. Meanwhile, TDD carriers can be loosely deployed on top of FDD carriers with lower transmit power to enhance the data throughput. With these characteristics, FDD carriers and TDD carriers can provide different services with different quality of service (QoS). For example, FDD carriers can be used to provide latency sensitive services, e.g., voice and video streaming, and TDD carriers can be used as traffic offloading to provide delay-tolerant data services, e.g., FTP, and HTTP.

In addition, some requirements from operators for FDD-TDD joint operation network should be considered. First, Voice over IMS (IP Multimedia Subsystem) might be provided in FDD cells only such that a UE needs to connect to FDD cells to obtain voice service. Second, FDD cells and TDD cells from different venders might be deployed; interfaces of inter-vendor nodes may hardly be open and coordinated. In the future, a dual mode UE is expected to support FDD-TDD joint operation. The dual mode UE that is equipped with both FDD and TDD Radio Frequency modules (RFs) may utilize the characteristics of the FDD carrier and the TDD carrier in a TDM (time-division multiplexing) manner. For example, the UE receives FTP downloading from a TDD carrier, switches to a FDD carrier to receive and transmit a voice call and then switches back to the TDD carrier to continue the FTP service or to start a new delay-tolerant service.

Figure 1:
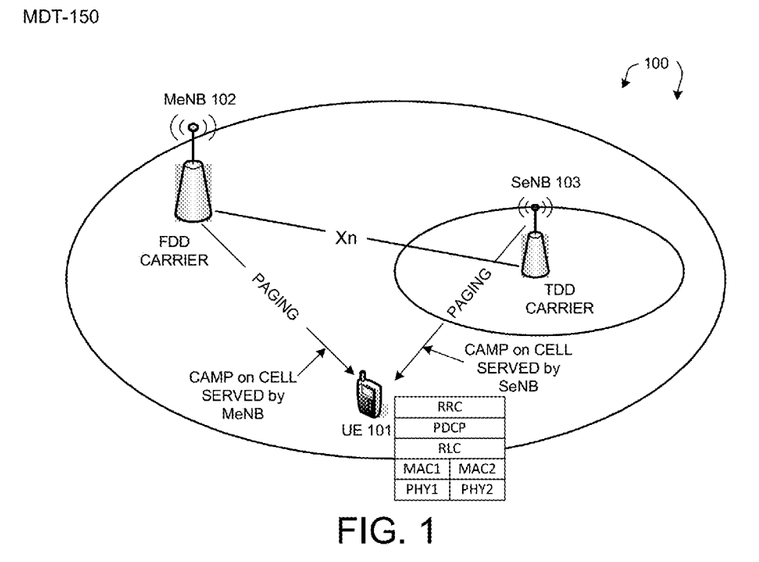
FIG. 1 illustrates a mobile communication network with a dual mode user equipment (UE) supporting FDD-TDD joint operation in accordance with one novel aspect.

FIG. 1 illustrates a mobile communication network 100 with a dual mode user equipment (UE) 101 supporting FDD-TDD joint operation in accordance with one novel aspect. Mobile communication network 100 comprises UE 101, macro eNodeB MeNB 102, and small eNodeB SeNB 103. In the following descriptions, it is assumed that macro eNB has an FDD carrier and small eNB has a TDD carrier architecture. However, the invention is not limited to these architectures. For example, the invention can be implemented using a macro eNB with a TDD carrier and a small eNB with an FDD carrier, a macro cell to macro cell architecture (with FDD-FDD, TDD-TDD, and/or FDD-TDD), or a small cell to small cell architecture (with FDD-FDD, TDD-TDD, and/or FDD-TDD).

In the example of FIG. 1, the mobile communication network 100 is an LTE system. In the LTE system, an idle mode UE should select a public land mobile network (PLMN) and camp on a suitable cell of the selected PLMN. For example, UE 101 may camp on a cell served by MeNB 102, or camp on a cell served by SeNB 103. Upon camping on a cell, UE 101 enters radio resource control (RRC) idle mode. The purpose of camping on a cell in RRC idle mode is: a) it enables the UE to receive system information from the PLMN; b) when registered and if the UE wishes to establish a RRC connection, the registered UE can do so by initially accessing the network on the control channel of the camped cell; c) if the PLMN receives a call for the registered UE, the PLMN knows (in most cases) the set of tracking areas in which the UE is camped. As a result, the PLMN can then send a paging message for the UE on the control channels of all the cells in this set of tracking areas. The UE will then receive the paging message because it is tuned to the control channel of the camped cell in one of the registered tracking areas, and the UE can respond on that control channel; d) it enables the UE to receive Earthquake and Tsunami Warning System (ETWS) and Commercial Mobile Alert System (CMAS) notifications; and e) it enables the UE to receive Multimedia Broadcast Multicast Service (MBMS) services.

To support the new characteristics where FDD carriers and TDD carriers provide different services with different QoS or with different coverage or with different mobility robustness, UE enhancements of FDD-TDD network are proposed. In one embodiment, a dual mode UE is with higher priority to camp on a mode (e.g., a macro cell served by a macro eNB with FDD carrier) supporting voice over IMS in order to allow the UE to invoke the voice service directly. In another embodiment, a dual mode UE may camp on a small cell served by a small eNB with TDD carrier, and later switches to a target cell supporting voice over IMS in order to receive the IMS call. While in idle mode, the UE receives paging through the camped cell, e.g., either through the macro eNB or through the small eNB. In accordance with one novel aspect, the UE receives an enhanced paging message, which indicates additional paging information. The UE is able to determine the target cell based on the additional paging information. In yet another embodiment, a dual mode UE may establish an RRC connection with a source cell with TDD carrier, and later is handover or redirected to a target cell supporting voice over IMS. In accordance with one novel aspect, the handover or redirection criteria is not based on radio signal power or radio signal quality, but rather, is based on the cn domain and/or the additional paging information contained in the enhanced paging message.

Figure 2:
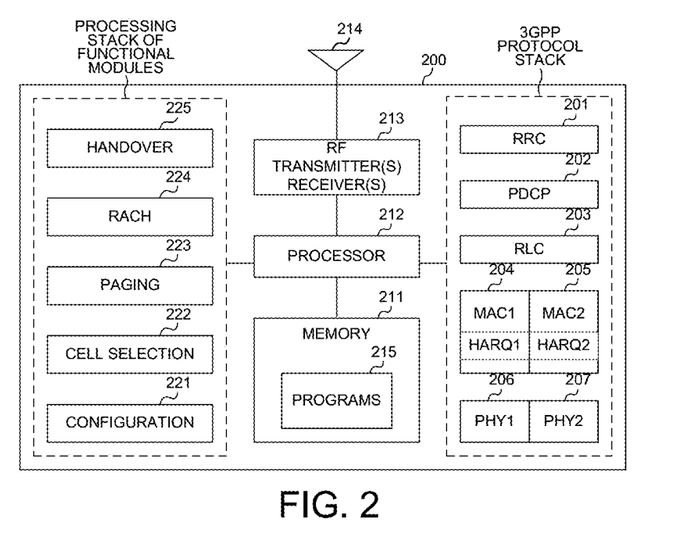
FIG. 2 is a simplified block diagram of a dual mode UE supporting FDD-TDD joint operation in accordance with one novel aspect.

FIG. 2 is a simplified block diagram of a dual mode UE 200 supporting FDD-TDD joint operation in accordance with one novel aspect. UE 200 comprises memory 211, a processor 212, a radio frequency (RF) transmitter(s) and receiver(s) module 213 coupled to antenna 214, and 3GPP protocol stack supporting various protocol layers including RRC 201, PDCP 202, RLC 203, MAC1 204, MAC2 205, PHY1 206, and PHY2 207. Note that, in order to support FDD-TDD joint operation, UE 200 is equipped at least with dual MAC and PHY layers to perform FDD and TDD operation independently. Each MAC layer has its own HARQ entity. In FIG. 2, for example, PHY1 and MAC1 are associated with an FDD carrier and PHY2 and MAC2 are associated with a TDD carrier. Each carrier has its own HARQ entity. UE 200 can operate in FDD carrier and TDD carrier jointly without flushing the PHY layer parameters and the MAC entities of one carrier when switching to the other carrier. Note that, further splitting in RLC and/or PDCP into dual entities can of course support FDD and TDD joint operation. For example (not shown), PDCP 202 may comprise PDCP1 and PDCP2, while RLC 203 may comprise RLC1 and RLC2. PDCP1 and RLC1 are associated with an FDD carrier and PDCP2 and RLC2 are associated with a TDD carrier. UE 200 is also equipped with both FDD and TDD RFs such that it can utilize FDD carrier and TDD carrier's characteristics in TDM (Time Division Multiplexing) manner. In transmitting direction, the transceiver(s) convert received baseband signals from the processor to RF signals and sends out to the antenna. In receiving direction, the processor processes the received baseband signals from the transceiver(s) and invoke different functional modules to perform various features supported by the UE.

The different function modules can be implemented by software/firmware codes, hardware circuits, or any combination thereof. The function modules, when executed by the processor (e.g., by executing programs 215 in memory 211), allow the UE to perform RRC idle mode as well as RRC connected mode enhancement for FDD-TDD joint operation. The function modules include a configuration module 221 that receives configuration information from the network, a cell selection module 222 that performs cell selection for entering RRC idle mode, a paging module 223 for receiving paging message in RRC idle mode, a random access channel (RACH) module 224 for performing random access to connect to the network, and a handover module 225 for performing handover in RRC connected mode.

Figure 3:
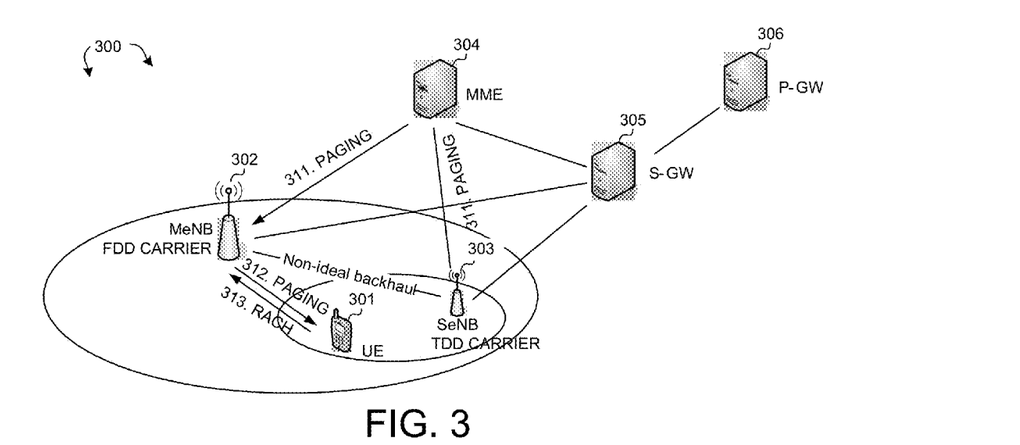
FIG. 3 illustrates a dual mode UE camped on a macro eNodeB with paging enhancement.

FIG. 3 illustrates a dual mode UE camped on macro eNodeB with paging enhancement in a mobile communication network 300. Mobile communication network 300 comprises a dual mode UE 301, a macro eNB MeNB 302 with FDD carrier, a small eNB SeNB 303 with TDD carrier, a mobility management entity MME 304, a serving gateway S-GW 305, and a packet data network (PDN) gateway P-GW 306. In this embodiment, a dual mode UE is with higher priority to camp on a mode supporting voice over IMS in order to allow the UE the invoke voice service directly from the same mode as much as possible. Once the voice service is finished, the UE can be directed to other mode to continue other data services, e.g., FTP and HTPP.

As illustrated in FIG. 3, dual mode UE 301 in idle mode is with higher priority to camp on a MeNB no matter its location. As a result, UE 301 camps on the MeNB with FDD carrier, listens to the paging from the MeNB, and establishes RRC connection with the MeNB if the UE receives paging belongs to the UE. For example, UE 301 is in idle mode and is camped on MeNB 302. UE 301 should acquire system information of MeNB 302 and listen to paging from MeNB 302. When an IMS (IP Multimedia Subsystem) voice call for UE 301 is coming, MME 304 will send paging (step 311) with cn-Domain=PS to MeNB 302 and MeNB 302 will forward the paging (step 312) to UE 301 in the UE's paging occasion. Once UE 301 receives the paging, UE 301 performs RACH (step 313) for RRC connection setup to receive the IMS voice call through MeNB 302.

Figure 4:
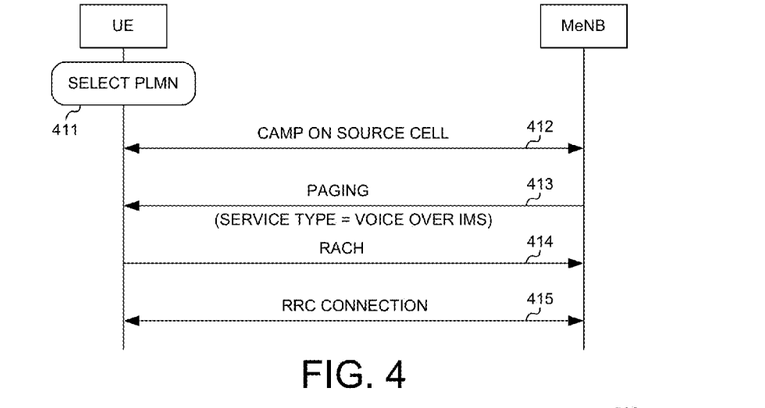
FIG. 4 illustrates one embodiment of dual mode UE in idle mode camped on a macro eNodeB (FDD carrier) with paging enhancement.

FIG. 4 illustrates one embodiment of a dual mode UE in idle mode camped on macro eNodeB (FDD carrier) with paging enhancement. The UE first selects a PLMN (step 411) and camps on a macro cell served by the MeNB of the selected PLMN (step 412). The macro/FDD cell is with higher priority as compared to a small/TDD cell because voice over IMS is only provided in FDD cells, not in TDD cells. In idle mode, the UE acquires system information of the macrocell and listens to paging from the MeNB. In step 413, when an IMS voice call is coming, the UE receives a paging message from the MeNB, which indicates cn-Domain=PS. In step 414, the UE performs RACH with the MeNB. Finally, in step 415, the UE establishes an RRC connection with the MeNB to receive the IMS voice call.

In the above example, the UE camps on a macro cell and later establishes RRC connection with the same macro cell because the paging message indicates that the IMS voice call is supported by the macro cell, which is a FDD cell with FDD carrier. However, if the originally camped source cell does not support the IMS voice call, then the UE may choose another target cell to establish the RRC connection. In one novel aspect, an enhanced paging message may contain additional paging information, which can be used by the UE in determining the target cell for establishing the RRC connection and thereby receiving the corresponding service.

Figure 5:
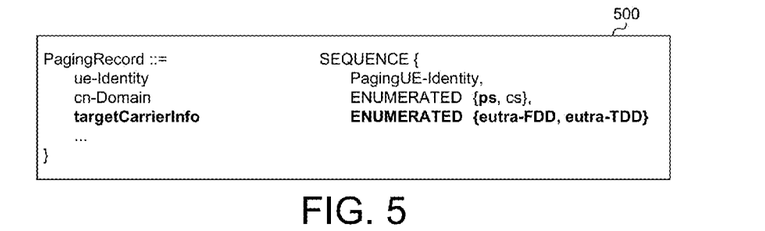
FIG. 5 illustrates an example of a paging message indicating additional paging information.

FIG. 5 illustrates an enhanced paging message 500 indicating additional paging information. A typical paging message contains a sequence of paging record list, system information modification, ETWS indication, and other extensions. As shown in FIG. 5, each paging record may contain a sequence of information including UE-identity, cn-Domain={PS, CS}, target carrier information={EUTRA-FDD, EUTRA-TDD}, etc. For example, if an IMS voice call comes in for a UE, then the cn-Domain should be indicated as "PS" for packet switching. In addition, target carrier information should be indicated as "EUTRA-FDD" for voice over IMS. Furthermore, service type information and/or QoS class indicator (QCI) of a bearer can be indicated in the enhanced paging message.

In general, a dual mode UE is allowed to camp on a small cell or a small eNB (SeNB) so that the UE should acquire the system information of the small cell and listen to its paging from the SeNB. Once an IMS call belonging to the UE comes, MME will send a paging message to the SeNB, wherein the cn-Domain in the paging message should be indicated as PS and more information element can be indicated in the paging message. For example, the target carrier information can be indicated. The target carrier should be indicated as "EUTRA-FDD" for voice over IMS. The SeNB should forward the paging message to the UE. Once the UE read the paging with cn-Domain=PS and target carrier information=EUTRA-FDD, the UE knows an IMS call comes and the UE should perform RACH in an EUTRA FDD carrier and make RRC connection to that FDD carrier.

Figure 6:
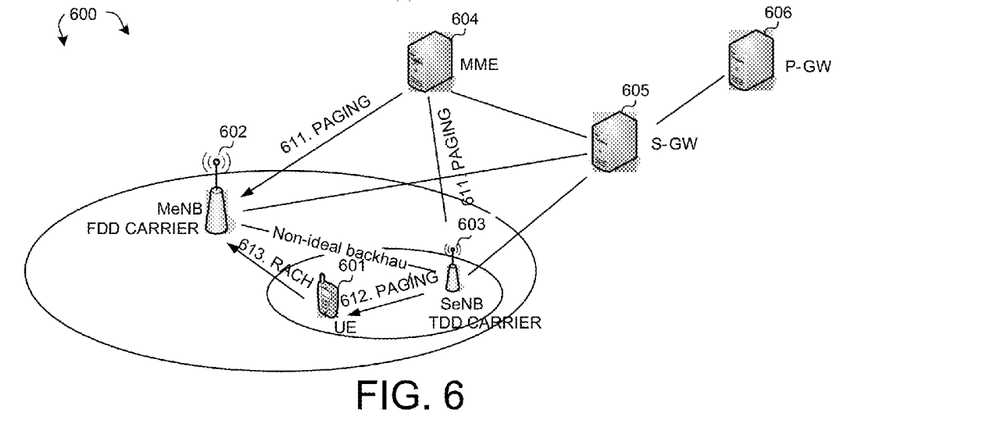
FIG. 6 illustrates a dual mode UE camped on a small eNodeB with paging enhancement.

FIG. 6 illustrates a dual mode UE camped on small eNodeB with paging enhancement in a mobile communication network 600. Mobile communication network 600 comprises a UE 601, a macro eNB MeNB 602, a small eNB SeNB 603, a mobility management entity MME 604, a serving gateway S-GW 605, and a packet data network (PDN) gateway P-GW 606. In this embodiment, UE 601 is in idle mode and is camped on a small cell served by SeNB 603. UE 601 should acquire the system information of the small cell and listen to paging from SeNB 603. When an voice over IMS call for UE 601 is coming, MME 604 will send a paging message (step 611) with cn-Domain=PS and indicate the target carrier=EUTRA-FDD to SeNB 603 and SeNB 603 will forward the paging message (step 612) to UE 601 in the UE's paging occasion, as shown in FIG. 6. Once UE 601 receives the paging, the UE performs RACH (step 613) with a target cell having EUTRA FDD carrier type, e.g., MeNB 602, for the RRC connection setup to receive the IMS call.

In the enhanced paging message, the service type information or the QCI (QoS class indicator) of a bearer can be indicated in the paging message. For example, service type="IMS service" or "voice" or "video streaming" or "delay sensitive service" or QCI="0" (i.e., IMS service) can be indicated in the paging message. However, the indication is not limited to the list above. The indications, which can be used to indicate the service type or bearer type that can or cannot be provided in a cell belongs to the scope of this invention. When a UE receives a paging indicating the service type as "IMS service" or "voice" or "video streaming" or "delay sensitive service" which cannot be provided in the camped cell, the UE performs RACH with a carrier that can provide that kind of service, e.g., MeNB, for the RRC connection setup to receive the service. Similarly, when a UE receives a paging indicating the QCI="0" (meaning "IMS service") which cannot be provided in the camped cell, the UE performs RACH with a carrier which can provide that kind of service, e.g., MeNB, for the RRC connection setup to receive the service.

Figure 7:
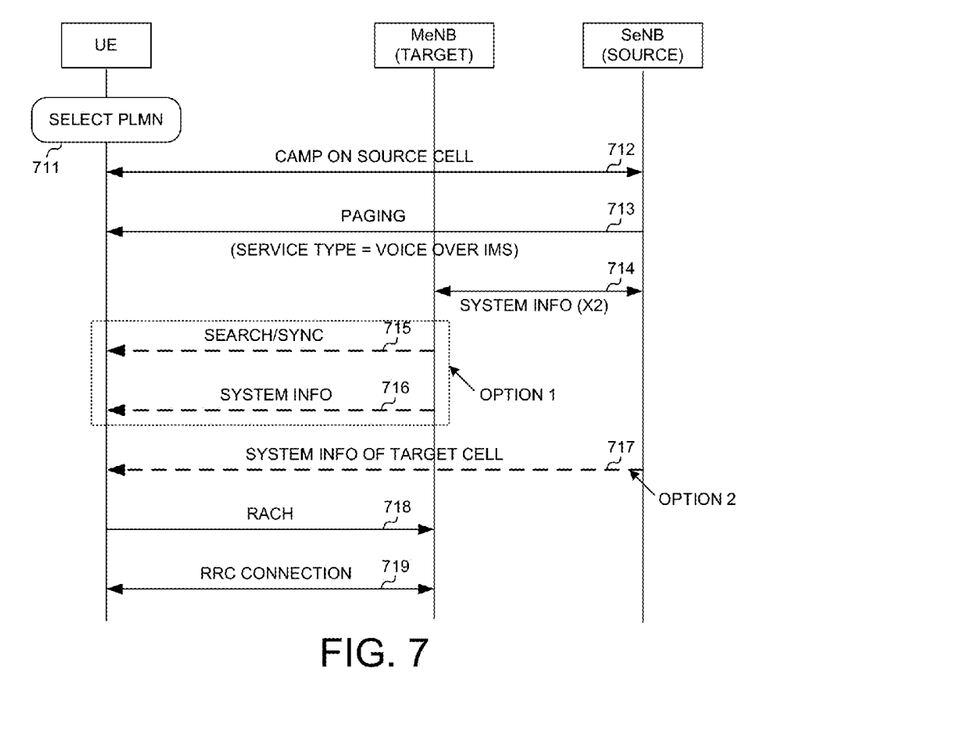
FIG. 7 illustrates one embodiment of dual mode UE in idle mode camped on a small eNodeB (TDD carrier) with paging enhancement.

FIG. 7 illustrates one embodiment of dual mode UE in idle mode camped on small eNodeB (TDD carrier) with paging enhancement. The UE first selects a PLMN (step 711) and camps on a suitable small cell served by the SeNB of the selected PLMN (step 712). The small cell or SeNB is referred to as the source cell. In idle mode, the UE acquires system information of the small cell and listens to paging from the SeNB. In step 713, when an IMS voice call is coming, the UE receives a paging message from the SeNB, which indicates cn-Domain=PS, target carrier=EUTRA-FDD, service type=IMS service, or QCI=0. Based on the additional information carried in the paging message, the UE knows that it needs to connect to a new target cell (different from the source cell) that provides the corresponding service. For example, the UE determines to connect to a new microcell served by a MeNB with FDD carrier for voice over IMS service.

When a UE receives a paging message that indicates making RRC connection to a new target cell that is not the source cell the UE originally camping on, the UE should acquire the system information (with RACH resource allocation) of the new target cell to perform RACH. In a first option, the system information can be acquired by UE itself from a target MeNB that serves the target cell. For example, in step 715, the UE should first search the target cell and detect the synchronization signal of the target cell. In step 716, the UE receives the system information of the target cell from the MeNB in order to perform RACH and RRC connection to the cell. In a second option, the system information of the new target cell can be provided by the original source cell/SeNB. For example, in step 717, the system information for RRC connection of target cell can be provided by the source SeNB if the source SeNB can acquire the system information of the target cell through X2 interface (step 714). This can speed up the UE to make RRC connection to the target cell. Once the UE acquires system information of the target cell, the UE knows its RACH resource allocation. In step 718, the UE performs RACH with the target MeNB. Finally, in step 719, the UE establishes an RRC connection with the MeNB to receive the IMS voice call.

While a dual mode UE in idle mode can determine a suitable target cell it should connect with based on the enhanced paging message, the dual mode UE can also establish an RRC connection with the original source cell it camps on first, and later handover or redirect to another target cell that supports the desired service (e.g., voice over IMS). A dual mode UE is allowed to camp on a small cell so that it should acquire the system information of small cell and listen to its paging from small cell. Once an IMS call belonging to the UE comes, MME will send the paging to the SeNB, wherein the cn-Domain should be indicated as PS. The SeNB should forward the paging to the UE. Once the UE read the paging with cn-Domain=PS, it performs RACH to the SeNB and setup the RRC connection with the SeNB. Since the SeNB cannot provide voice over IMS service to the UE, the SeNB should help the UE to handover to another cell that supports voice over IMS service. Alternatively, the SeNB should release the RRC connection and re-direct the UE to another cell with voice over IMS service.

Figure 8:
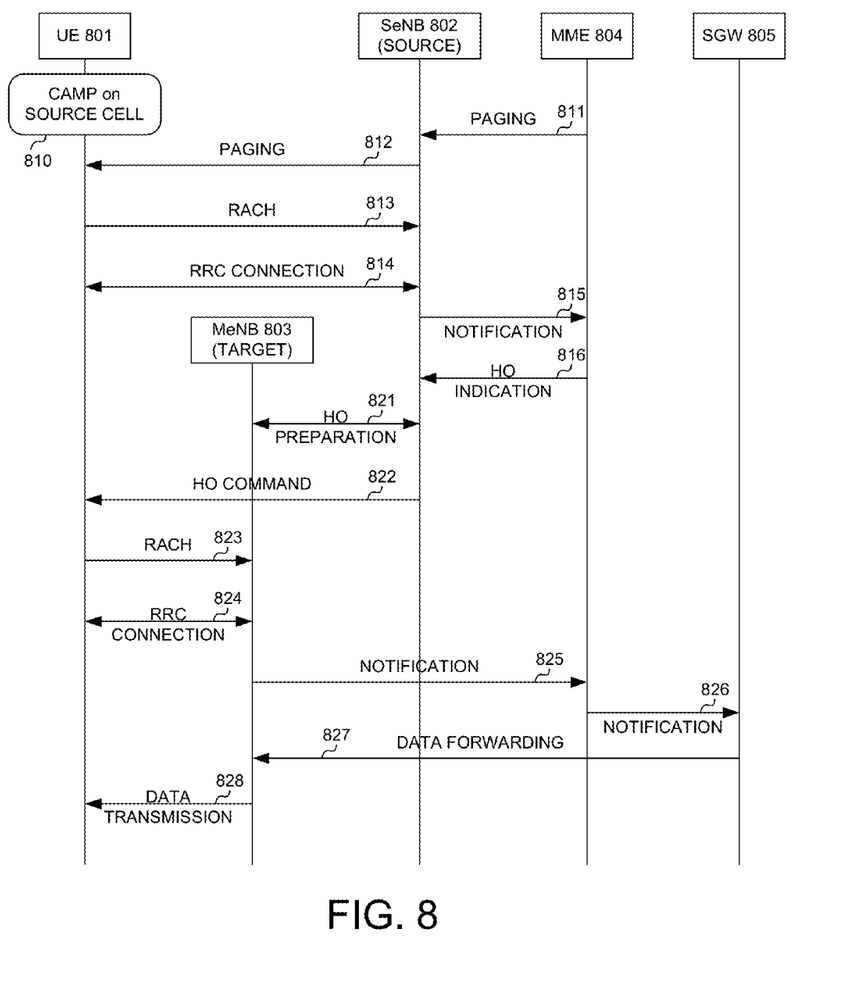
FIG. 8 illustrates one embodiment of a dual mode UE performing handover from a TDD carrier source cell to a FDD carrier target cell.

FIG. 8 illustrates one embodiment of a dual mode UE performing handover from a TDD carrier source cell to a FDD carrier target cell. In step 810, UE 801 camps on a source small cell served by SeNB 802. UE 801 acquires system information of the small cell and listens to paging from SeNB 802. When an IMS call belong to UE 801 comes, MME 804 sends a paging message to SeNB 802 (step 811). In step 812, SeNB 802 forwards the paging message to UE 801. In step 813, UE 801 performs a RACH procedure with SeNB 802. In step 814, UE 801 establishes an RRC connection with SeNB 802. SeNB 802 then notifies MME 804 that UE 801 is RRC connected to SeNB 802 (step 815). However, since SeNB 802 cannot provide voice over IMS service to the UE, MME 804 sends a handover (HO) indication to SeNB 802 to instruct SeNB 802 to hand off the UE to other target eNB (step 816). In step 821, SeNB 802 and a target MeNB 803 perform HO preparation. In step 822, SeNB 802 sends an HO command to UE 801 to handoff the UE to target MeNB 803 with FDD carrier that supports voice over IMS service. UE 801 then performs RACH (step 823) and establishes RRC connection to target MeNB 803 (step 824). In step 825, MeNB 803 notifies MME 804 about the UE's connection, and MME 804 sends a notification to a serving gateway S-GW 805 (step 826). Finally, S-GW 805 forwards UE data of the IMS call to MeNB 803 (step 827) and MeNB 803 transmits the data to UE 801 in step 828.

Figure 9:
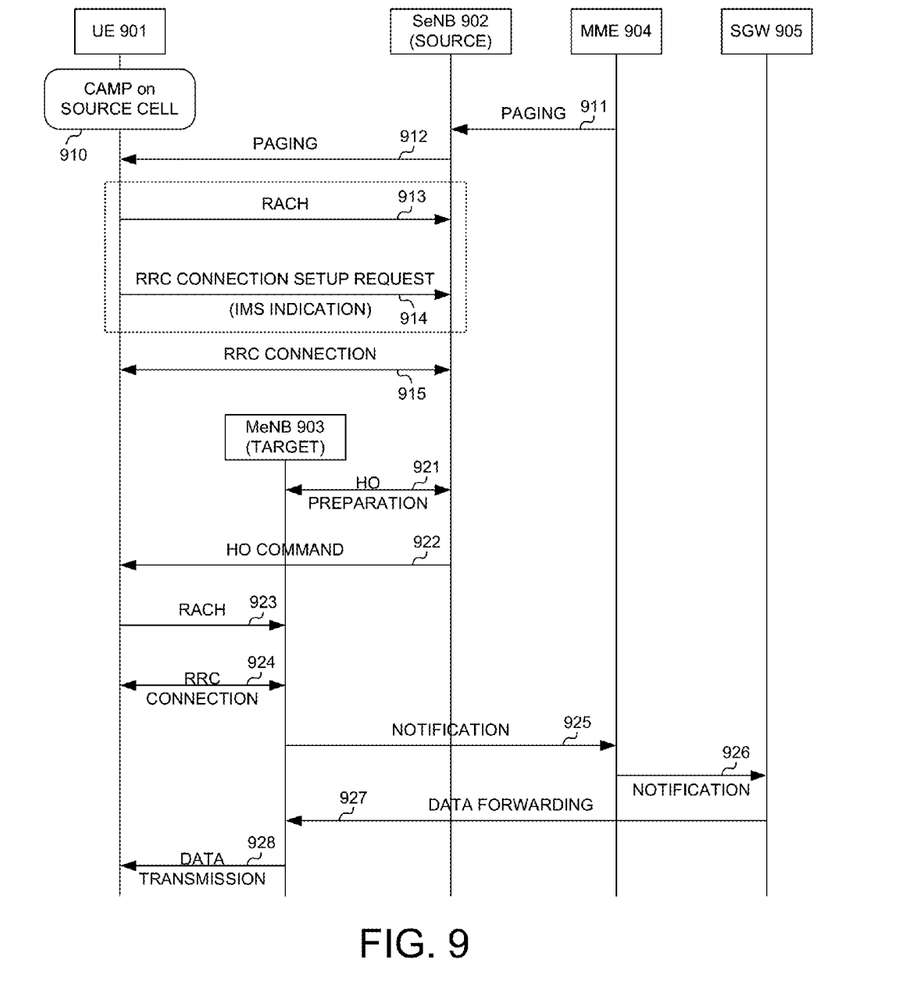
FIG. 9 illustrates another embodiment of a dual mode UE performing handover from a TDD carrier source cell to a FDD carrier target cell.

FIG. 9 illustrates another embodiment of a dual mode UE performing handover from a TDD carrier source cell to a FDD carrier target cell. In the embodiment of FIG. 8, the inter-frequency handover is triggered by MME 804 by sending an indication to SeNB 802. In the embodiment of FIG. 9, the inter-frequency handover is triggered by UE itself. In step 910, UE 901 camps on a source small cell served by SeNB 902. UE 901 acquires system information of the small cell and listens to paging from SeNB 902. When an IMS call belong to UE 901 comes, MME 904 sends a paging message to SeNB 902 (step 911). In step 912, SeNB 902 forwards the paging message to UE 901. In step 913, UE 901 performs a RACH procedure with SeNB 902. When UE 901 detects that paging information indicating IMS service, the UE can send an IMS indication to its source eNB in the RACH procedure. For example, in step 914, UE 901 sends the IMS indication in the message 3 with the RRC connection setup request. Note that an MO (mobile originated) IMS call can also apply this IMS indication. In step 915, UE 901 establishes an RRC connection with SeNB 902. Once SeNB 902 receives the IMS indication, it knows the UE attempts to receive or to transmit an IMS call. However, since SeNB 902 cannot provide voice over IMS service to the UE, the SeNB should prepare the inter-frequency handover to the UE and send the handover command to the UE. In step 921, SeNB 902 and a target MeNB 903 perform HO preparation. In step 922, SeNB 902 sends an HO command to UE 901 to handoff the UE to a target MeNB with FDD carrier that supports voice over IMS service. UE 901 then performs RACH (step 923) and establishes RRC connection to target MeNB 903 (step 924). In step 925, MeNB 903 notifies MME 904 about the UE's connection, and MME 904 sends a notification to a serving gateway S-GW 905 (step 926). Finally, S-GW 905 forwards UE data of the IMS call to MeNB 903 (step 927) and MeNB 903 transmits the data to UE 901 in step 928.

In some cases, source eNB may not be able to prepare the target eNB to a UE. Since a small eNB and a macro eNB may not be physically collocated, there should be transmission medium and interface between the macro eNB and the small eNB. Assume Xn interface is introduced for communications between the macro eNB and the small eNB. From real deployment perspective, it cannot always assume the ideal backhaul connections, e.g., optical fiber, exist between the macro eNB and the small eNB. When multiple handshaking for handover preparation are needed and if the non-ideal backhaul is in between two eNBs, the delay of handover preparation might be large. If the source eNB cannot prepare the target eNB for a UE, the source eNB can release the UE's RRC connection and redirect the UE to the target eNB. When the UE enters idle mode, it should camp on the redirected target carrier with higher priority. The UE can then setup RRC connection to the redirected target cell for the desired service.

Figure 10:
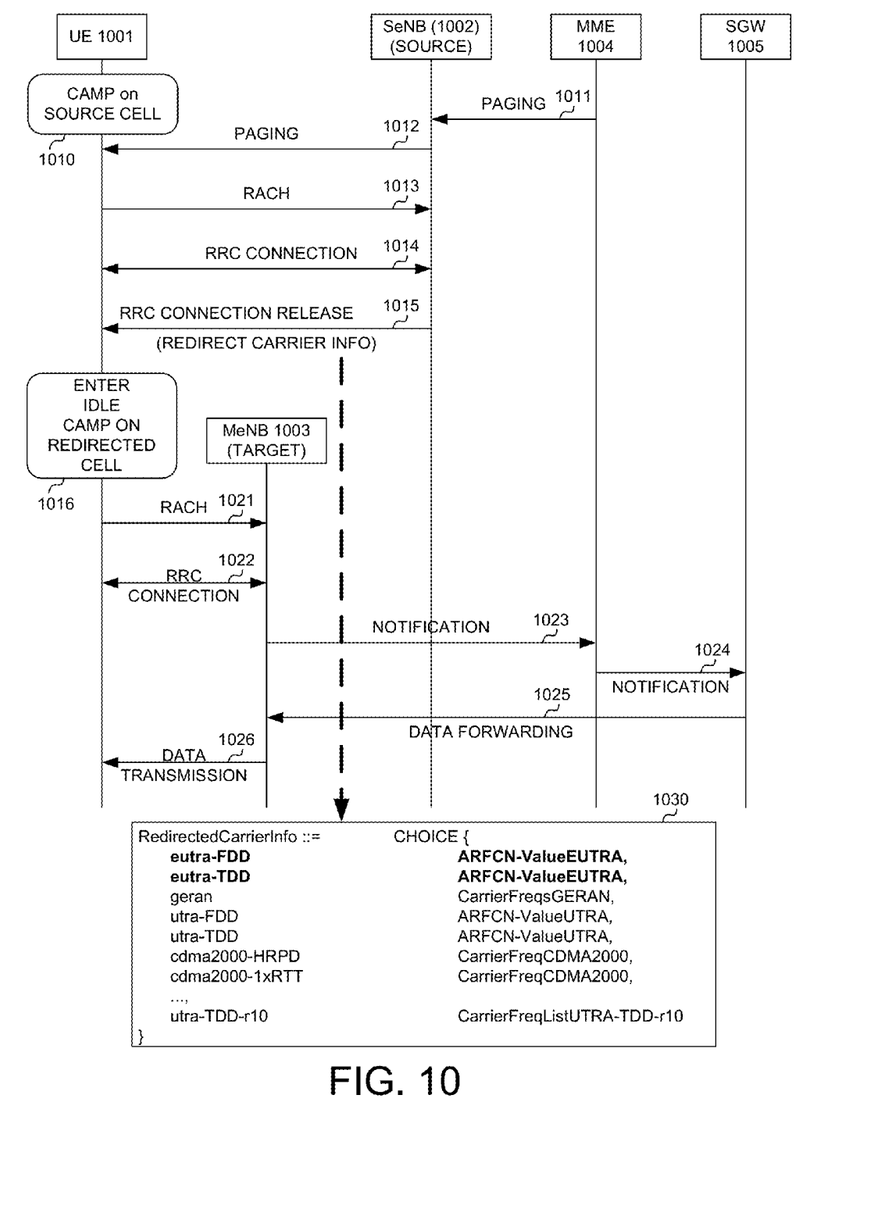
FIG. 10 illustrates one embodiment of a dual mode UE performing cell redirection from a TDD carrier source cell to a FDD carrier target cell.

FIG. 10 illustrates one embodiment of a dual mode UE performing cell redirection from a TDD carrier source cell to a FDD carrier target cell. In step 1010, UE 1001 camps on a source small cell served by SeNB 1002. UE 1001 acquires system information of the small cell and listens to paging from SeNB 1002. When an IMS call belong to UE 1001 comes, MME 1004 sends a paging message to SeNB 1002 (step 1011). In step 1012, SeNB 1002 forwards the paging message to UE 1001. In step 1013, UE 1001 performs RACH procedure with SeNB 1002. In step 1014, UE 1001 establishes an RRC connection with SeNB 1002. Since the source SeNB 1002 is not able to prepare the target MeNB 1003 to UE 1001, in step 1015, SeNB 1002 hands off the UE to MeNB 1003 by sending an RRC connection release with redirect carrier information indicating the target cell. The UE then releases the RRC connection to SeNB 1002, enters idle mode again, and camps on the redirected target carrier of MeNB 1003 (step 1016). UE 1001 then performs RACH procedure with MeNB 1003 (step 1021) and makes RRC connection to that target carrier (step 1022). In step 1023, MeNB 1003 notifies MME 1004 about the UE's connection, and MME 1004 sends a notification to a serving gateway S-GW 1005 (step 1024). Finally, S-GW 1005 forwards UE data of the IMS call to MeNB 1003 (step 1025) and MeNB 1003 transmits the data to UE 1001 in step 1026. The redirected carrier info contained in the RRC connection release should further distinguish EUTRA-FDD and EUTRA-TDD, as shown by table 1030 in FIG. 10.

Additional information can be added in the paging message to provide more information for dual mode UEs to select an appropriate cell to camp on. Other information, for example, the cell loading related information, can be added to guide the idle mode UEs to select a lighter load cell to camp on.

In one embodiment, cell loading information is provided by MME. eNBs can send their cell loading information to MME. MME collects the cell loading information of each cell within its tracking area and indicates this information to idle mode UEs under the tracking area through paging message. The UEs can perform cell reselection to camp on other cell if the cell it camps on is in heavy load situation. The cell loading information can be quantized into {low, medium, high}. MME can broadcast the cell with loading high to the idle mode UEs. If a UE finds it camps on a high load cell, it can perform cell reselection to other non-high load cell. The cell reselection criterion should jointly consider the signal strength of a measured cell and the cell loading information provided in the paging.

In another embodiment, cell loading information is provided by eNB. The cell loading information can be provided by eNB itself. eNB can add its cell loading in the paging message. When UEs camping on the high load cell receive the cell loading indication, the UEs can perform cell reselection to camp on other cells. When an eNB is in high load situation, it can add a load indication in the paging message to inform the UEs camped on its cells. Once the UEs receive the high load indication, they can perform cell reselection to other non-high load cells. The cell reselection criterion should jointly consider the signal strength of a measured cell and the cell loading information provided in the paging.

Figure 11:
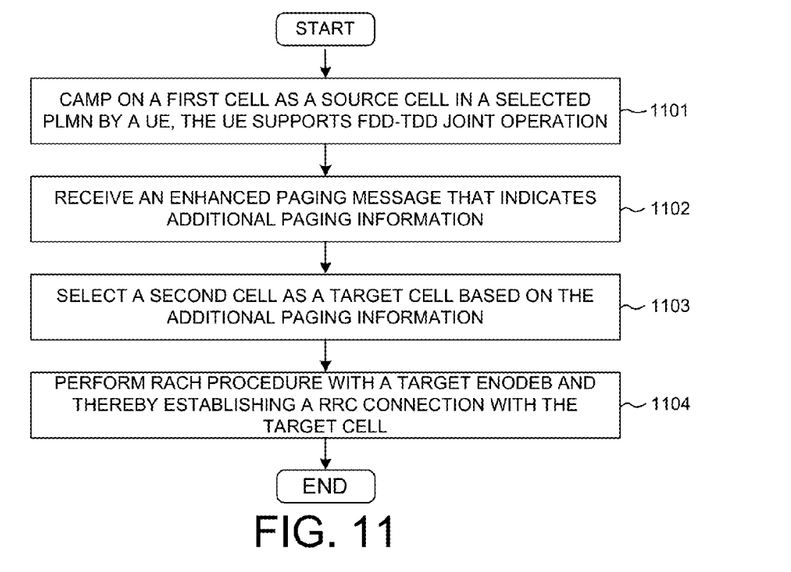
FIG. 11 is a flow chart of a method of UE enhancement in idle mode for FDD-TDD joint operation in accordance with one novel aspect.

FIG. 11 is a flow chart of a method of UE enhancement in idle mode for FDD-TDD joint operation in accordance with one novel aspect. In step 1101, a dual mode UE camps on a first cell as a source cell in a selected PLMN. The UE supports FDD-TDD joint operation. In step 1102, the UE receives an enhanced paging message that indicates additional paging information. In step 1103, the UE selects a second cell as a target cell based on the additional paging information. In step 1104, the UE performs RACH procedure with a target base station and thereby establishes an RRC connection with the target cell. The additional paging message comprises at least one of a target carrier type, a service type that triggers the paging, and a QoS class indicator (QCI). In one embodiment, the target cell is different from the source cell if the additional paging information indicates that the source cell does not belong to the same target carrier type or the source cell does not support the same service type or QCI indicated by the paging.

Figure 12:
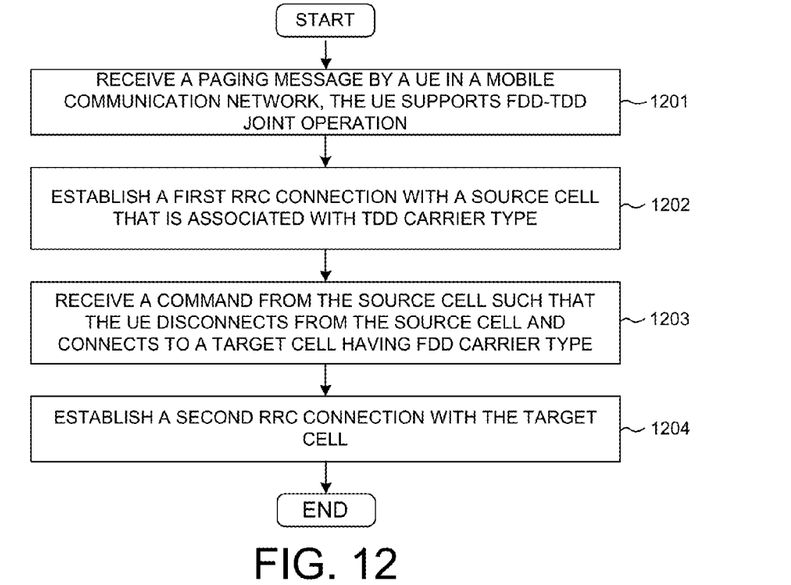
FIG. 12 is a flow chart of a method of UE enhancement in connected mode for FDD-TDD joint operation in accordance with one novel aspect.

FIG. 12 is a flow chart of a method of UE enhancement in connected mode for FDD-TDD joint operation in accordance with one novel aspect. In step 1201, a dual mode UE receives a paging message in a mobile communication network. The UE supports FDD-TDD joint operation. In step 1202, the UE establishes a first RRC connection with a source cell that is associated with TDD carrier type. In step 1203, the UE receives a command from the source cell such that the UE disconnects from the source cell and connects to a target cell having FDD carrier type. In step 1204, the UE establishes a second RRC connection with the target cell. In one embodiment, the command is a handover command for the UE to handover from the source cell to the target cell. In another embodiment, the command is a redirect command for the UE to enter idle mode and camp on the target cell with a higher priority, and then connect with the target cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    camping on a first cell as a source cell in a selected public land mobile network (PLMN) by a user equipment (UE), wherein the UE supports FDD-TDD joint operation, and wherein the first cell has a time division duplex (TDD) carrier type that transmits or receives one at a time so as to provide a delay-tolerant service;
    receiving an enhanced paging message that indicates an incoming transmission for the UE and includes additional paging information on a service type of the incoming transmission;
    selecting a second cell as a target cell that supports frequency division duplex (FDD) operation based on the additional paging information, wherein the target cell has a FDD carrier type that provides a delay-sensitive service indicated by the additional paging information; and
    performing random access channel (RACH) procedure with a target base station and thereby establishing a radio resource control (RRC) connection with the target cell.

2. The method of claim 1, wherein the additional paging information includes at least one of a target carrier type, the service type that triggers the paging, and a QoS class indicator (QCI).

3. The method of claim 2, wherein the UE selects the second cell to be a different cell from the first cell if the first cell does not belong to the same target carrier type.

4. The method of claim 2, wherein the UE selects the second cell to be a different cell from the first cell if the first cell does not support the service type or the QCI.

5. The method of claim 1, wherein the additional paging information includes a service type supported by a FDD carrier type that triggers the paging, and wherein the service type is taken from the group consisting of: an IMS service, a voice service, and a video streaming service.

6. The method of claim 1, wherein the second cell is different from the first cell, the method further comprising:
performing scanning and synchronizing with the second cell; and
receiving system information of the second cell from the target base station before performing the RACH procedure.

7. The method of claim 1, wherein the second cell is different from the first cell, the method further comprising:
acquiring system information of the second cell from the source cell before performing the RACH procedure.

8. The method of claim 1, wherein the incoming transmission is voice over IMS (IP Multimedia Subsystem), wherein the source cell does not support voice over IMS, and wherein the target cell does support voice over IMS.

9. The method of claim 1, wherein the delay-tolerant service is FTP or HTTP.

10. A user equipment (UE), comprising:
a receiver that receives an enhanced paging message that includes additional paging information;
a memory; and
a processor, wherein the processor executes program instructions stored in the memory, and wherein the program instructions comprise:
a cell selection module that selects a first cell and camps on the first cell as a source cell in a public land mobile network (PLMN), wherein the UE supports FDD-TDD joint operation, and wherein the source cell has a time division duplex (TDD) carrier type that transmits or receives one at a time so as to provide a delay-tolerant service;
a handover (HO) module that selects a second cell as a target cell that supports frequency division duplex (FDD) operation based on the additional paging information, wherein the additional paging information indicates a service type of an incoming transmission for the UE, and wherein the target cell has a FDD carrier type that provides a delay-sensitive service indicated by the additional paging information; and
a random access channel (RACH) module that performs RACH procedure with a target base station and thereby establishing a radio resource control (RRC) connection with the target cell.

11. The UE of claim 10, wherein the additional paging information includes at least one of a target carrier type, the service type that triggers the paging, and a QoS class indicator (QCI).

12. The UE of claim 11, wherein the UE selects the second cell to be a different cell from the first cell if the first cell does not belong to the same target carrier type.

13. The UE of claim 11, wherein the UE selects the second cell to be a different cell from the first cell if the first cell does not support the service type or the QCI.

14. The UE of claim 10, wherein the additional paging information includes a service type supported by a FDD carrier type that triggers the paging, and wherein the service type is taken from the group consisting of: an IMS service, a voice service, and a video streaming service.

15. The UE of claim 10, wherein the second cell is different from the first cell, wherein the UE performs scanning and synchronizing with the second cell, and wherein the UE receives system information of the second cell from the target base station before performing the RACH procedure.

16. The UE of claim 10, wherein the second cell is different from the first cell, and wherein the UE acquires system information of the second cell from the source cell before performing the RACH procedure.

17. The UE of claim 10, wherein the incoming transmission is voice over IMS (IP Multimedia Subsystem), wherein the source cell does not support voice over IMS, and wherein the target cell does support voice over IMS.

18. A method, comprising:
receiving a paging message by a user equipment (UE) in a mobile communication network, wherein the UE supports FDD-TDD joint operation, and wherein the paging message indicates an incoming transmission for the UE having a delay-sensitive service type and using a frequency division duplex (FDD) carrier type;
establishing a first radio resource control (RRC) connection with a source cell, wherein the source cell has a TDD carrier type that provides a delay-sensitive service indicated by the paging message;
receiving a command from the source cell such that the UE disconnects from the source cell and connects to a target cell having the FDD carrier type; and
establishing a second RRC connection with the target cell.

19. The method of claim 18, wherein the command is a handover command for the UE to handover from the source cell to the target cell.

20. The method of claim 18, wherein the command is a redirect command for the UE to enter idle mode and camp on the target cell.

21. The method of claim 20, wherein the command is contained in an RRC connection release message indicating target carrier information of the target cell.

22. The method of claim 18, wherein the delay-sensitive service type is taken from the group consisting of: a voice over IMS (IP Multimedia Subsystem) service, a voice service, and a video streaming service.

23. The method of claim 22, wherein the UE sends an indication of IMS service to the source cell in an RRC connection setup request when establishing the first RRC connection.

* * * * *